L. E. CURTIS.
METHOD OF MANUFACTURING EXPANDED METAL.
APPLICATION FILED AUG. 7, 1915.
1,191,766.
Patented July 18, 1916.
4 SHEETS—SHEET 1.
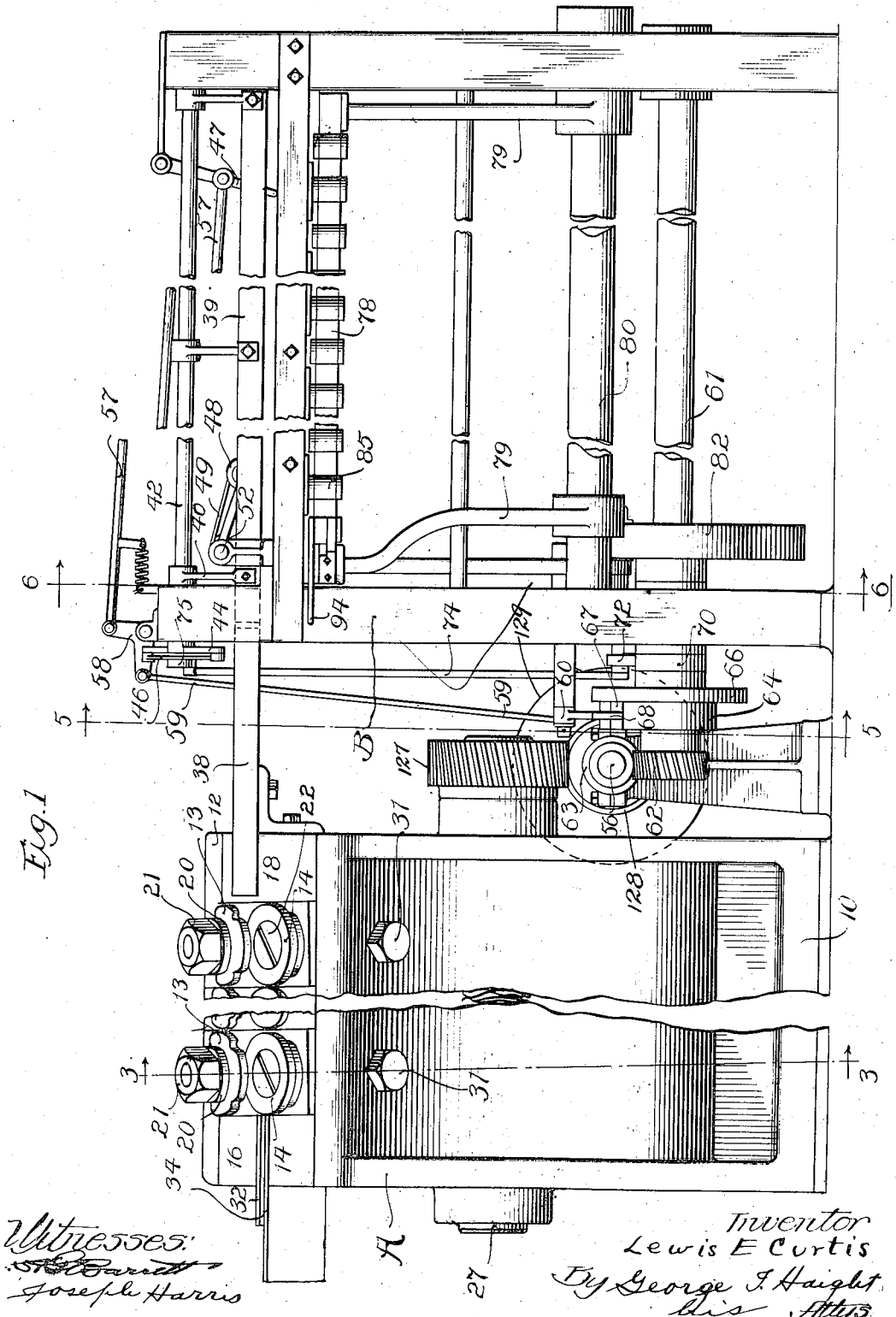

L. E. CURTIS.
METHOD OF MANUFACTURING EXPANDED METAL.
APPLICATION FILED AUG. 7, 1915.
1,191,766.
Patented July 18, 1916.
4 SHEETS—SHEET 2.
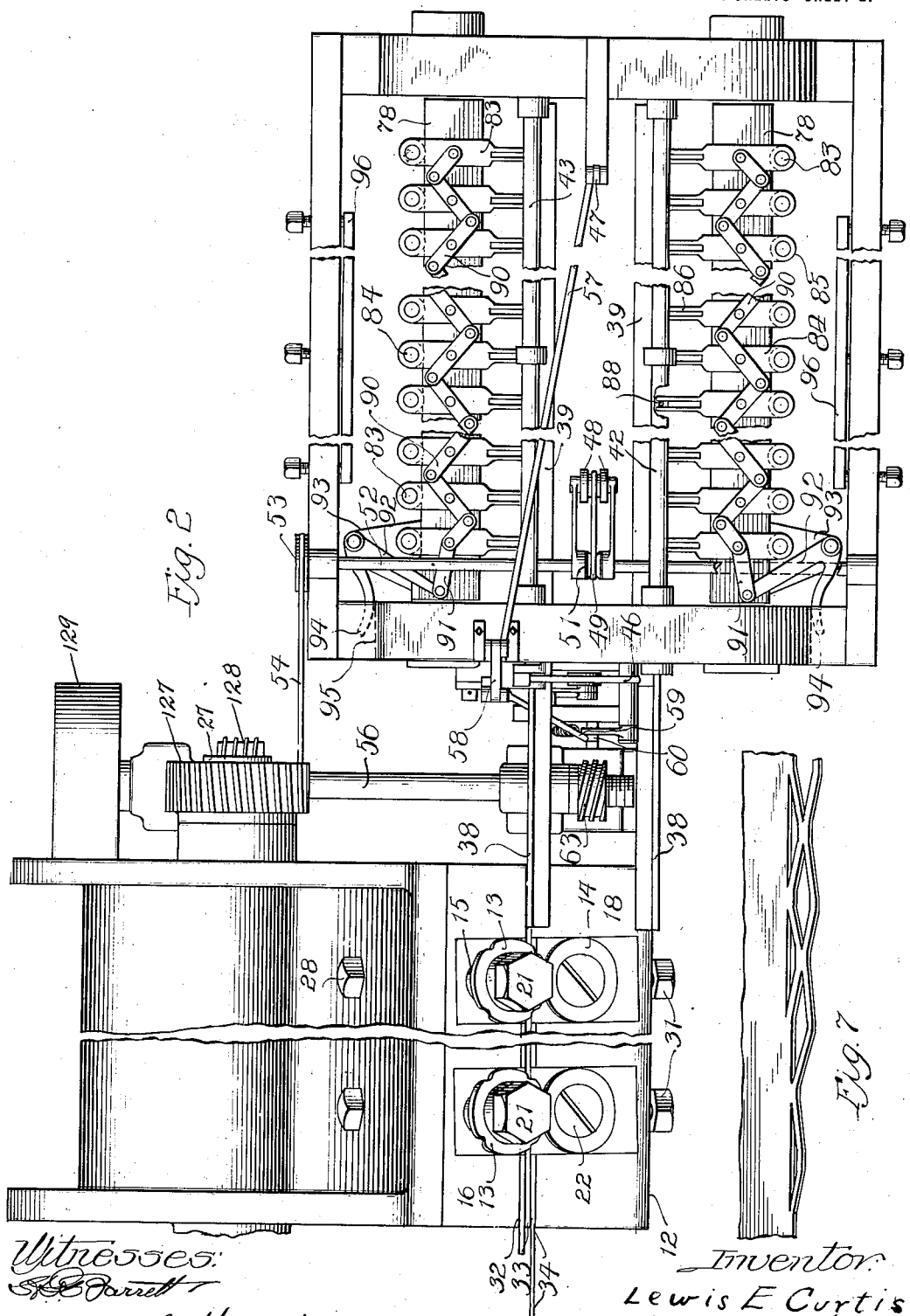

L. E. CURTIS.
METHOD OF MANUFACTURING EXPANDED METAL.
APPLICATION FILED AUG. 7, 1915.
1,191,766.
Patented July 18, 1916.
4 SHEETS—SHEET 3.
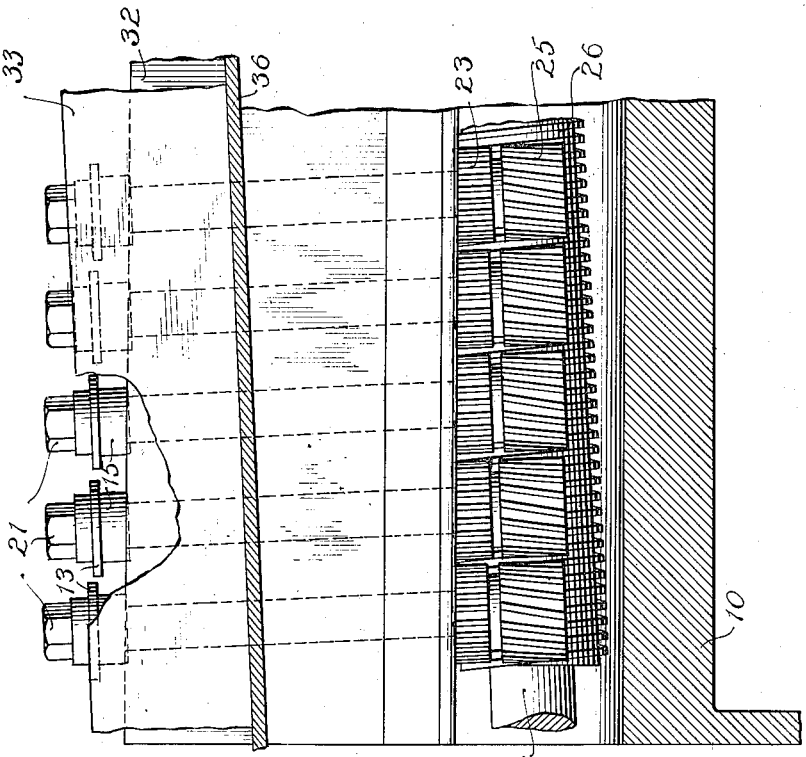
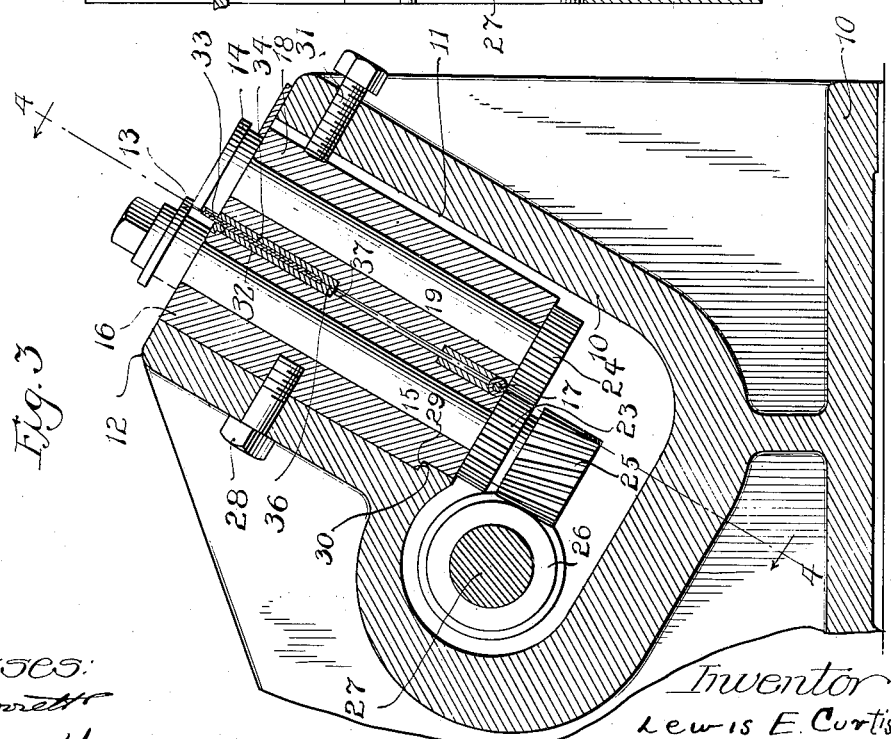

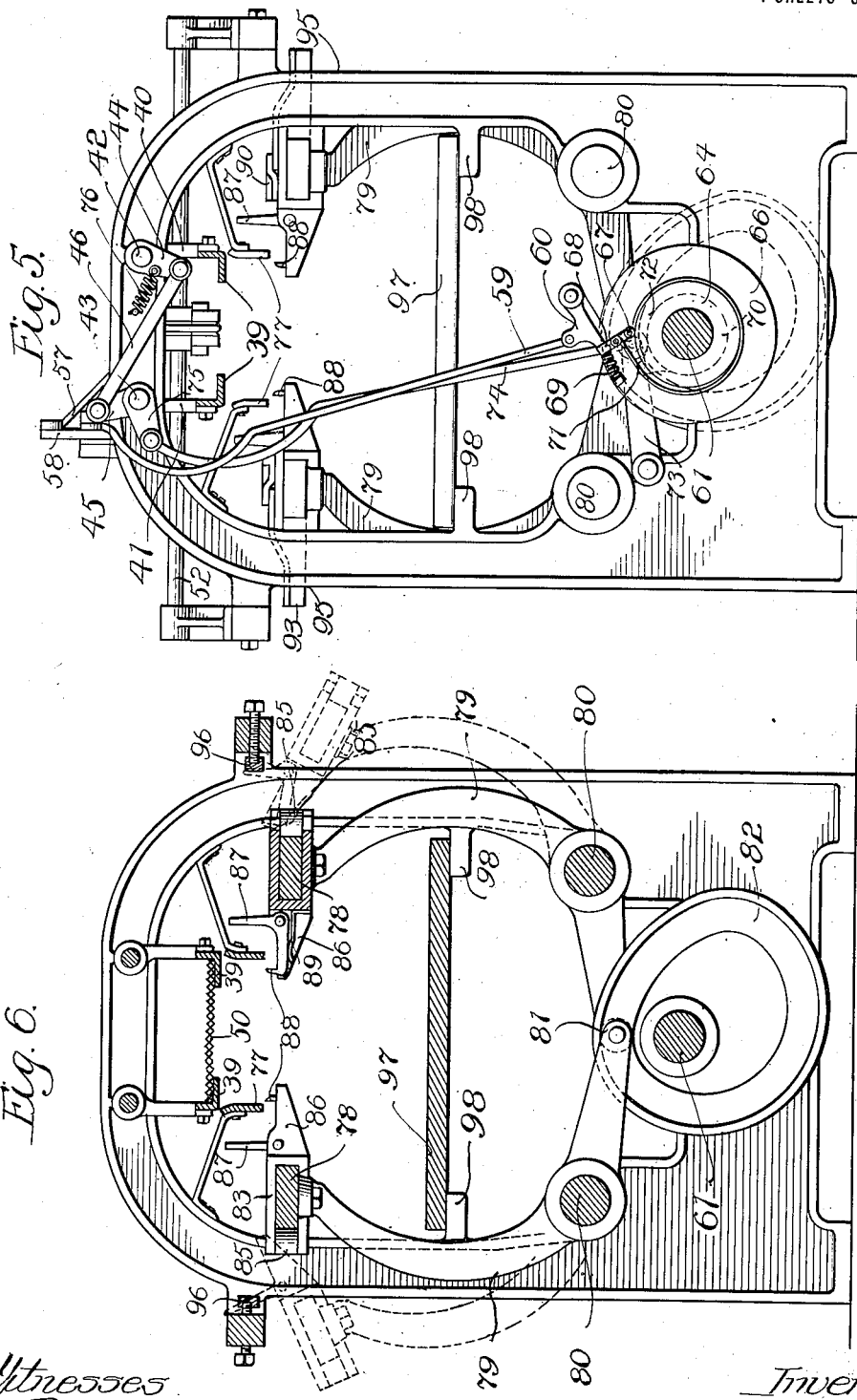

UNITED STATES PATENT OFFICE.

LEWIS E. CURTIS, OF KENILWORTH, ILLINOIS, ASSIGNOR TO AMES STEEL LATH COMPANY, OF ST. LOUIS, MISSOURI, A CORPORATION OF MISSOURI.

METHOD OF MANUFACTURING EXPANDED METAL.

1,191,766.

Specification of Letters Patent.

Patented July 18, 1916.

Application filed August 7, 1915. Serial No. 44,192.

*To all whom it may concern:*

Be it known that I, LEWIS E. CURTIS, a citizen of the United States, residing at Kenilworth, in the county of Cook and State of Illinois, have invented a certain new and useful Improvement in Methods of Manufacturing Expanded Metal, of which the following is a full, clear, concise, and exact description, reference being had to the accompanying drawings, forming a part of this specification.

This invention relates to improvements in methods of manufacturing expanded metal.

One object of the invention is to devise a method of manufacturing expanded metal, wherein a sheet is slitted and partially expanded or opened and then the complete expansion finished in a separate operation.

Another object of the invention is to devise a method of manufacturing expanded metal, wherein a sheet is simultaneously slitted and partially expanded and the final expansion subsequently completed in a separate operation.

A still further object of the invention is to devise a method of manufacturing expanded metal wherein the sheet is simultaneously slitted and partially expanded in a plane at an angle to the sheet, and the final expansion or opening of the strands is completed by stretching the partially expanded sheet in the plane thereof.

Other objects of the invention will be apparent from the description hereinafter following.

In the drawing forming a part of this specification, Figure 1 is a side elevation of a machine adapted for carrying out my improved process, parts being broken away in order to prevent crowding of the drawing. Fig. 2 is a top plan view of the structure illustrated in Fig. 1, parts being broken away to prevent crowding. Fig. 3 is a vertical sectional view taken substantially on the line 3—3 of Fig. 1, and showing in detail the arrangement of one of the sets of cutting or slitting rolls. Fig. 4 is a sectional view taken through the slitting machine proper, the section being substantially on the line 4—4 of Fig. 3. Figs. 5 and 6 are sectional views taken respectively on the lines 5—5 and 6—6 of Fig. 1, Fig. 6 illustrating in dotted lines the open or expanded position of the expanders proper. Fig. 7 is a view of a portion of a sheet partially expanded and as the same appears after passing the slitting rolls.

In said drawing, and referring more particularly to Figs. 1, 2, 3 and 4, the slitting machine, by which the sheet is partially expanded, is designated generally by the reference A, and the expander proper is designated by the reference B, the same being so arranged that the sheets are transferred automatically from the former to the latter, as hereinafter explained. The slitter and partial expander comprises, as shown, a heavy base casting 10 having a longitudinal, inclined recess 11, said recess being arranged perpendicular to the top wall 12 of said casting. Mounted within said recess 11 are a series of sets of slitting and partial-expanding cutters or rolls, the number of sets corresponding to the number of slits to be made transversely of the sheets. As shown, each set of cutters comprises a notched cutting disk 13 and a plain disk 14, the same being slightly overlapped, as clearly indicated in Figs. 1 and 3, the amount of overlap corresponding to the degree of partial expansion which is made by the slitting rolls. In practice, this will approximate one-third of the total amount to which the meshes are expanded. The notched disk 13 is mounted on an arbor 15, rotatably mounted in a bearing block 16, said block 16 being hinged as indicated at 17, see Fig. 3, to a corresponding bearing block 18, in which is rotatably mounted an arbor 19, to which the cutting disk 14 is secured. The disks 13 are held on their arbors by any suitable means such as the washers 20, and nuts 21, and the disks 14 are retained on their corresponding arbors by screws 22. Each pair of arbors or shafts 15 and 19, is provided with meshing gears 23 and 24 so that the cutting disks are rotated in unison. At its lower end, each arbor 15 is provided with a worm gear 25, which meshes with a worm 26, secured to the longitudinally extending shaft 27.

From the preceding description, it will be seen that all of the slitting disks or cutters are rotated at the same speed from the driving shaft 27. The driving shaft 27 is rotated by a worm gear 127 thereon which in turn meshes with a worm 128 secured to the power shaft 56, the latter being driven from any suitable outside source of power as by the pulley 129.

As will be noted in Fig. 3, each block 16 is securely and rigidly held in fixed position relatively to the casting 10, by means of a screw 28, said block 16 being provided with a shoulder 29 engaging a corresponding shoulder 30 in the casting 10. Inasmuch as the bearing blocks 18 are pivoted to the corresponding bearing blocks 16, the former may be adjusted, and to accomplish this result I have provided adjusting screws 31, one for each of the bearing blocks 18. The sheets of metal are guided through the slitter by means of a guide, which consists of a plate 32 seated in recesses 33 provided therefor along the inner faces of the bearing blocks 16, and a second plate 34, which is seated in suitably arranged recesses 35 provided therefor on the inner faces of the adjustable blocks 18. The plates 32 and 34 are spaced apart sufficiently to receive a sheet of metal therebetween, and the bottom of the guide-way is formed by a flange or shoulder 36 extending along the bottom of the plate 32. As clearly shown in Fig. 1, the guide plate 32 is extended beyond the end of the machine farther than the guide plate 34, to thereby facilitate the insertion of the sheets into the guide-way.

By referring to Figs. 1 and 4, it will be seen that the bottom of the guide for the sheets, as the same pass through the slitting machine, is inclined upwardly from the entrance end of the machine. As designated at 36 in Fig. 4, the angle of inclination will be the ratio between the width of the strands of the slitted sheet and the distance between centers of the bonds between the strands or, in general practice, the angle would be one-sixteenth inch rise to every one and one-eighth inch in length. As clearly shown in Fig. 4, the arbors or shafts on which the cutters are mounted are inclined from the vertical and perpendicular to the bottom of the guide-way 37 so that the slits made by the cutters will be parallel to the side edges of the sheets. However, the cutters are offset from each other, successively, a distance corresponding to the width of a strand. Hence, as the sheet is fed through the slitting machine, the cutters will slit the sheets with successive series of slits, the series of slits being arranged diagonally of the sheet, but each slit parallel to an edge of the sheet. It will be understood that I employ the terms "slit" or "slitting" herein as applied to the cutting operation on the sheet, as meaning to slit or cut the sheet into strands which are bonded.

From the preceding description, it will be seen that as the sheet passes through the slitting machine proper, the same will be partially expanded and deflected into a plane at an angle, preferably at a right angle, to the plane of the sheet. The slit and partially expanded sheet, therefore, leaves the slitting machine proper in substantially a horizontal position.

The slitted and partially expanded sheet is automatically fed by cutters to the expanding machine over a bridge comprising a pair of fixed angle irons 38—38, which bridge the gap between the two machines. Alined with the angle irons 38 on the expanding machine B, are two similar angle irons 39—39, which form a guide-way and temporary platform to receive the partially expanded sheet, as clearly indicated in Fig. 6. The angle irons 39—39 are secured to depending levers 40—41 secured to shafts 42 and 43 extending lengthwise of the expander. To the ends of the shafts 42 and 43 are secured oppositely extending short lever arms 44 and 45 connected by a link 46, whereby the shafts 42 and 43 are simultaneously operated, but in opposite directions, as hereinafter described. The slitted and partially expanded sheet 50 (see Fig. 6) is fed along the guides 39—39 until the front or advance edge thereof engages a pivoted finger 47 near the rear end of the expander. And in this connection it may be added that the sheet is fed, after it leaves the slitting rolls, by a gravity controlled, preferably roughened, feed roll 48, which is positively rotated by a belt 49, which takes over a pulley 51, secured to the transversely extending shaft 52, the latter having a pulley 53 at one end driven by a belt 54, which in turn is driven from a pulley (not shown) secured to the power shaft 56. When the advancing sheet strikes the finger 47, the latter is swung to the right, as shown in Fig. 1, thereby pulling the spring controlled connecting link 57, which is pivoted to the bellcrank 58. To the opposite arm of the bellcrank 58 is pivotally connected a rod 59 which, at its lower end, is pivotally connected to a detent 60, the latter being pivotally connected to the frame. (See Fig. 5). The lifting of the rod 59 and the detent 60 releases the band clutch about to be described.

By referring to Figs. 1, 2, 5 and 6, it will be seen that a shaft 61 is provided which extends longitudinally of the expander B near the bottom thereof. On the end of said shaft 61, adjacent to the slitting mechanism is loosely rotatably mounted, a worm gear 62 which is in mesh with and driven by a worm 63 on the power shaft 56. The worm gear 62 is rigid with a cylindrical clutch member 64, around which is looped a band 65. One end of the band 65 is attached to a disk 66 by a pin 67, the disk 66 being rigid or otherwise rigidly secured to the shaft 61. The opposite end of the band 65 is attached to a short lever 68, pivotally mounted on the disk 66 and preferably on said pin 67. The short lever 68 is controlled by a spring 69. When the clutch members are in the position shown in Fig. 5, that is, with the detent 60 pressing against the short lever 68, the shaft 61 will not rotate, but when the detent 60 is elevated and the lever 68 thereby released and actuated by the spring 69, the band 65 will tighten about the drum or clutch member 64 and thereby rotate the shaft 61. By the time the shaft 61 has been given a complete rotation the detent 60 will have been lowered to thereby release the clutch as hereinafter described. Fixed to the shaft 61 at the rear of the clutch mechanism is a cam 70, having projection 71 thereon, with a quick rise, which engages a roller 72 carried by a pivoted lever 73. Pivotally connected to the lever 73 is a rod 74, which at its upper end is pivoted to a lever 75 secured to the shaft 43. As the advancing sheet engages the finger 47, the clutch is operated in the manner heretofore described, thereby causing a single rotation of the shaft 61. This causes the actuation of the rod 74, which in turn produces oscillation of the shafts 42 and 43, and thereby swings the guide angle irons 39—39 outwardly. This action is relatively rapid due to the shape of the projection 71 and the guiding angles 39—39 are returned to normal position by the spring 76.

By the foregoing described action, the partially expanded sheet 50 is dropped down through the stationary guide plates 77 onto the expanders. As shown, the expanders comprise two parallel, longitudinally extending bars 78—78, carried by the levers 79—79, fixed to rocker shafts 80—80. The opposite ends of the levers 79 are provided with anti-friction rollers 81—81 which travel in groove cams 82—82 affixed to the shaft 61.

From the preceding, it will be seen that the bars 78—78 will be spread outwardly or moved apart to the position indicated by dotted lines in Fig. 6, once for each rotation of the shaft 61. Mounted on the bars 78—78 are a plurality of blocks 83 and 84. The blocks 84 are located centrally of the bars 78 and are rigid therewith, whereas all the blocks 83 are slidable back and forth on the bars 78 for the purpose hereinafter described. Each of the blocks 83 is substantially U-shape in cross section where it fits over the bar 78, as clearly illustrated in Fig. 6, and at its outer end is provided with an anti-friction roller 85 to minimize friction and wear on the parts. Each of the blocks 83 and 84, at its inner end is forked, as indicated at 86, and pivotally mounted between each pair of forks 86 is a bellcrank 87, the horizontal arm of which is provided with a finger or catch 88 which projects slightly above the top faces of the forks 86. The bellcranks 87 are retained in the normal position shown in Fig. 6, by springs 89. All the blocks 83 and 84 are connected by a series of pivoted links 90, which operate somewhat in the manner of lazy tongs, so that the amount of movement of each block 83 will be the same relatively to each other. From the end blocks 83 nearest the slitting machine proper, extend links 91 which are pivotally connected with levers 92 pivoted on brackets 93 secured to the bars 78—78. The levers 92 are each provided with an arm 94 which, upon inward movement of the bars 78—78, as hereinafter described, are adapted to engage stops or shoulders 95 formed on the frame.

When a partially expanded sheet 50 is dropped from the swinging guides 39, the same is guided by the members 77 onto the fingers 88 carried by the expander bars 78, and said fingers will engage in the meshes of the sheet. Immediately after the sheet 50 has been deposited on said fingers and caught by the latter, the cams 82 operate the levers 79 to thereby swing the bars 78 outwardly, thus stretching the metal in the plane of the sheet. As the sheet is pulled transversely in the manner above described, its length naturally decreases and this is compensated for by the slidable blocks 83, and due to the link connections 90 the decrease in length of the sheet will be uniform throughout. The stretching or expanding of the sheet is continued until the vertically extending arms of the bellcranks 87 engage the adjustable releasing or tripping bars 96 on each side of the machine. The bellcranks 87 are tilted by these bars so that the expanded sheet is stripped from the fingers 88, as will be apparent from the dotted position of the parts shown in Fig. 6. This releases the expanded sheet which then falls down upon the table 97, which I have shown as removably supported on brackets 98 formed integrally with the frame. After a sufficient quantity of expanded sheets have been deposited on the table 97, the same can be removed either by taking them from the table or by taking the table and sheets out at the end of the machine. The outward movement of the bars 78 commences immediately after a partially expanded sheet has been deposited thereon, and is slow relatively to the operation of the swinging guides 39. This is done in order to permit the guides 39 to assume their normal position so that the next sheet is being fed onto the guides 39 while the final expanding of the first sheet is taking place.

From the preceding description, it will be seen that the sheets are partially expanded simultaneously with the slitting thereof, and the sheet, which is inserted in the machine in a nearly vertical position, is delivered from the slitting machine proper in a substantially horizontal position, and the final expansion takes place also in a horizontal plane. The operation of the combined machines A and B is substantially continuous, and by partially expanding the sheet as it is slitted the sheet is made stiff and thereby rendered more easily handled in being transferred to the expanders which complete the opening of the meshes. Also, by partially expanding the metal at the slitting operation, a more uniform expansion or opening of the machines is obtained during the final expanding operation.

The machine which I have herein shown and described merely illustrates one arrangement for carrying out my improved process, and it will be understood by those skilled in the art that the improved process may be carried out by different mechanisms, and furthermore, that changes and variations may be made in the steps of the process without departing from the spirit of the invention, and all such changes and modifications are contemplated as come within the scope of the claims appended hereto.

I claim:

1. The herein described method of forming expanded metal which includes, slitting an entire sheet and only partially expanding the sheet, the width of the sheet being increased by the partial expanding operation, and then concluding the expansion of the sheet in a separate operation.

2. The herein described method of forming expanded metal which includes, simultaneously slitting and partially expanding an entire sheet, and then completing the expanding by a distinct and separate expanding operation.

3. The herein described method of forming expanded metal which includes, slitting a sheet into bonded strands and partially opening up the strands thus formed and deflecting the sheet as an entirety into a plane at an angle to the original plane of the sheet, and then completing the expansion of the slitted and partially expanded sheet by a separate expanding operation.

4. The herein described method of forming expanded metal which includes, slitting a sheet and simultaneously partially expanding the same and thereby deflecting the sheet into a plane at an angle to the original plane of the sheet, and then completing the expansion by a separate operation.

5. The herein described method of forming expanded metal which includes, slitting a sheet into bonded strands and partially expanding the openings thus formed, the sheet as an entirety being deflected during the slitting and partial expanding operation into a plane substantially at right angles to the original plane of the sheet, and finally completing the expansion of the sheet in a separate operation by opening up the partially expanded sheet in the plane to which it has been deflected.

6. The herein described method of forming expanded metal which includes, slitting a sheet and simultaneously partially expanding the same and thereby deflecting the sheet into a plane substantially at right angles to the original plane of the sheet, and then completing the expansion of the sheet in the plane of the partially expanded sheet.

7. The herein described method of forming expanded metal which includes, slitting an entire sheet with successive diagonally arranged series of slits with bonds therebetween and partially expanding the entire sheet in a plane at an angle thereto, and then completing the expanding operation in the plane of the partially expanded sheet.

8. The herein described method of forming expanded metal which includes, slitting an entire sheet with diagonally arranged series of slits with bonds therebetween and simultaneously partially expanding the sheet in a plane at an angle thereto, and then completing the expanding operation of the entire sheet in the plane of the partially expanded sheet.

9. The herein described method of forming expanded metal which includes, slitting a sheet in one plane, partially expanding the sheet and increasing its width, and then completing the expanding operation in a plane substantially at right angles to the original plane of the sheet.

10. The herein described method of forming expanded metal which includes, slitting a sheet, partially expanding the sheet by opening successive series of meshes diagonally of the sheet and increasing its width, and then completing the expansion of the sheet by pulling the same in lines perpendicular to the side edges of the sheet.

11. The herein described method of forming expanded metal which includes, slitting a sheet, simultaneously partially expanding the sheet by opening successive series of meshes diagonally of the sheet and increasing its width, and then completing the expansion of the sheet by pulling the same in lines perpendicular to the side edges of the sheet.

12. The herein described method of forming expanded metal which includes, slitting an entire sheet into bonded strands, partially expanding the sheet considered as an entirety, as thus cut to increase the width thereof throughout its length, and then, in a distinct operation, completing the expansion of the sheet by stretching it to its final full width.

13. The process of forming expanded metal which includes, slitting a sheet into bonded strands and partially expanding or opening up each strand simultaneously with the slitting operation by which the strand is formed and thereby increasing the width of the sheet, and then finally stretching the sheet as an entirety to complete the expansion.

In witness that I claim the foregoing I have hereunto subscribed my name this 16th day of July 1915.

LEWIS E. CURTIS.

Witnesses:
JOSEPH HARRIS,
ELIZABETH M. BRITT.